(12) United States Patent
Vetrovec (10) Patent No.: US 9,490,604 B2
(45) Date of Patent: Nov. 8, 2016

(54) SOLID-STATE LASER WITH MULTI-PASS BEAM DELIVERY OPTICS

(76) Inventor: Jan Vetrovec, Larkspur, CO (US)

( * ) Notice: Subject to any disclaimer, the term of this patent is extended or adjusted under 35 U.S.C. 154(b) by 76 days.

(21) Appl. No.: 12/931,094

(22) Filed: Jan. 24, 2011

(65) Prior Publication Data

US 2012/0155503 A1   Jun. 21, 2012

Related U.S. Application Data

(60) Provisional application No. 61/336,513, filed on Jan. 23, 2010.

(51) Int. Cl.
*H01S 3/14* (2006.01)
*H01S 3/08* (2006.01)
*H01S 3/06* (2006.01)

(52) U.S. Cl.
CPC .................................. *H01S 3/0604* (2013.01)

(58) Field of Classification Search
USPC ................. 372/50.12, 68, 99, 101, 107, 108
See application file for complete search history.

(56) References Cited

U.S. PATENT DOCUMENTS 5,659,563 A * 8/1997 Reed et al. .................... 372/101

\* cited by examiner

*Primary Examiner* — Armando Rodriguez
(74) *Attorney, Agent, or Firm* — Chris Villani (57) ABSTRACT

A laser system including two laser amplifier modules, each comprising a solid-state laser gain material (LGM) disk, and a multi-pass optical assembly comprising a plurality of relay mirrors. The relay mirrors are grouped in two relay mirror groups. Individual relay mirrors are arranged to pass a laser beam from the first LGM disk to the second LGM disk and back to the first LGM disk, and so on. The laser beam is amplified with each pass through the LGM disk. The relay mirrors may be arranged to repeat the process of passing the laser beam to and from the two LGM disks arbitrary number of times until the desired laser beam amplification is attained. At that point, the laser beam may either released from the laser system, reflected back causing it to retrace its path through the system. This configuration increases the effective gain and improves laser power extraction.

14 Claims, 8 Drawing Sheets

SOLID-STATE LASER WITH MULTI-PASS BEAM DELIVERY OPTICS

CROSS-REFERENCE TO RELATED APPLICATIONS

This application claims priority from U.S. provisional patent application U.S. Ser. No. 61/336,513, filed on Jan. 23, 2010 and entitled "Solid-State Laser with Multi-Pass Beam Delivery Optics."

FIELD OF THE INVENTION

The present invention relates to lasers and more particularly to a solid-state laser or the like and a multi-pass optical assembly.

BACKGROUND OF THE INVENTION

Figure 1:
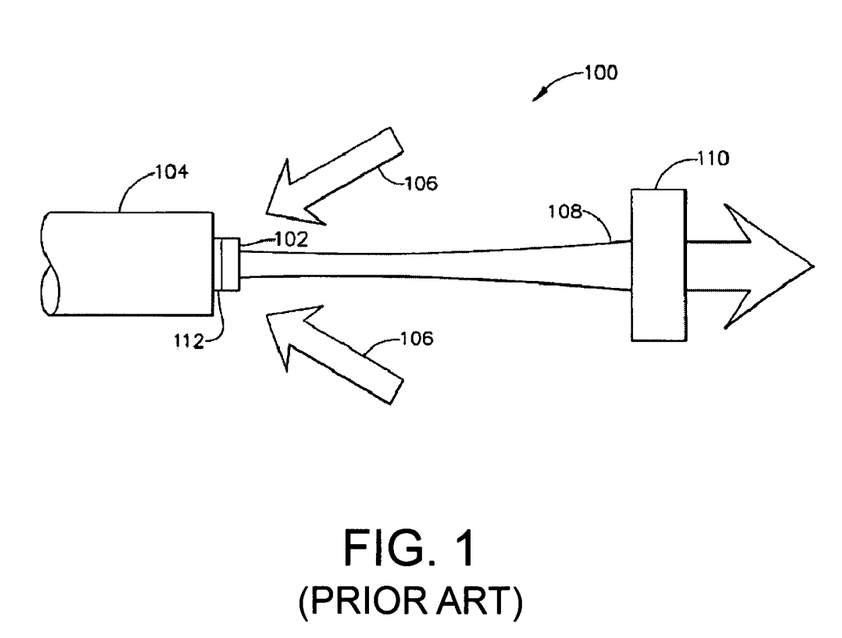
FIG. 1 is a block diagram of an example of a prior art single-pass laser optical assembly.

Solid-state disk lasers and the like are being used in many new applications. Examples of such applications may include but are not necessarily limited to military laser target illuminators or designators and commercial laser material processing applications such as cutting, welding, drilling or the like. Such applications typically require laser powers between about 5 kW and about 10 kW. A single solid-state disk laser may be able to generate enough power for an industrial laser device; however, the amplifier disk may be relatively thin, about 0.5 to 2.5 mm, which may translate to a rather short gain length. Consequently, if a single solid-state disk laser amplifier is used in a traditional single pass resonator, such as the single-pass laser resonator 100 illustrated in FIG. 1, the resonator gain would be too low to buildup enough recirculating power to saturate the solid-state gain medium of the disk laser 102. In FIG. 1, the solid-state disk laser (SSDL) 102 may be thermally coupled to a heat sink 104. Pump beams 106 may be directed on the SSDL 102 to generate an amplified beam 108 directed through an output coupler 110. A reflective coating 112 may be disposed between the SSDL 102 and the heat sink 104 on a surface of the SSDL 102.

Figure 2:
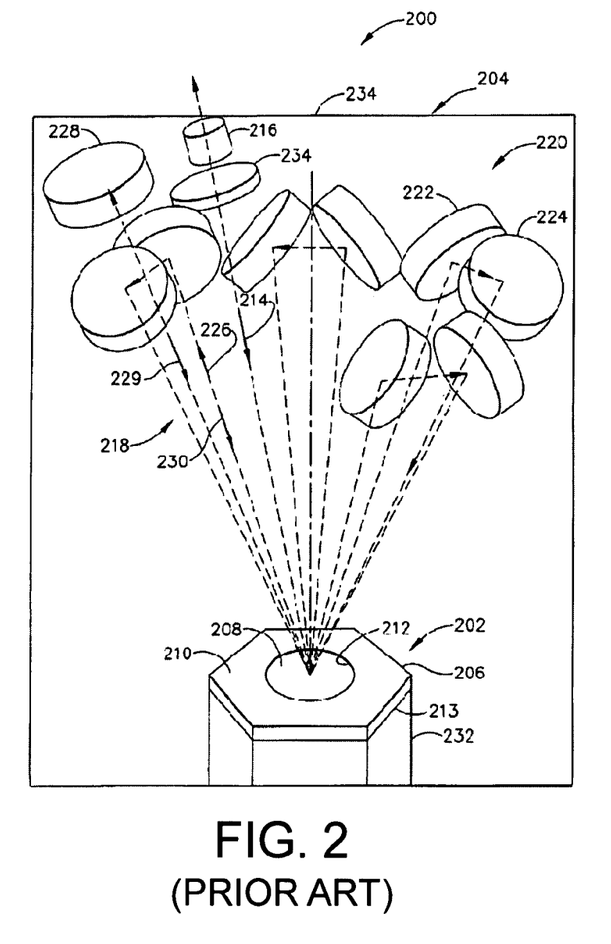
FIG. 2 is an isometric view of an example of a prior art laser system including a solid-state laser and a multi-pass laser resonator.

The U.S. Pat. No. 7,463,667 granted on Dec. 9, 2008 to the Applicant and incorporated herein by reference in its entirety discloses a laser system including a solid-state laser gain material (LGM) and a plurality of relay mirrors for multi-passing a laser beam to and from the LGM. Referring now to FIG. 2, the laser system 200 requires that for each laser beam pass to the LGM disk 206, two relay mirrors are used. It is well known in the art that the surface accuracy of relay mirrors is limited to a fraction of a laser wavelength, typically to about ½0th a wave at 628 nm wavelength. A wavefront of a laser beam reflected from such a mirror is imparted at least some of the inaccuracy of the mirror surface. As a results, the beam quality (BQ) of the laser beam is significantly degraded with each reflection from a relay mirror. It is therefore desirable to achieve laser amplification with fewer relay mirrors. Furthermore, the configuration of relay mirrors disclosed in the U.S. Pat. No. 7,463,667 limits the laser system to only one LGM, thereby limiting the laser power output.

In summary, prior art does not teach a laser system with LGM disks and multi-pass beam delivery optics capable of producing very high average power with good beam quality which is also very compact and robust. It is against this background that the significant improvements and advancements of the present invention have taken place.

SUMMARY OF THE INVENTION

In accordance with an embodiment of the present invention, a laser system including two laser amplifier modules, each comprising a solid-state laser gain material (LGM) disk. The system also includes a multi-pass optical assembly including a plurality of relay mirrors. The plurality of relay mirrors is grouped in two relay mirror groups. Individual relay mirrors may be arranged to pass a laser beam from the first LGM disk to the second LGM disk and back to the first LGM disk. The laser beam is amplified with each pass through the LGM disk. In particular, a first relay mirror in the first group may be arranged to receive a laser beam from the LGM disk in the first module (first LGM disk) and to pass the laser beam to another relay mirror in the second group, which then passes the laser beam to the LGM disk in the second amplifier module (second LGM disk). Yet another relay mirror from the second group then receives the laser beam reflected from the second LGM disk and passes it to still another relay mirror in the first group. The still another mirror may reflect the beam back to the first LGM disk, and so on. The relay mirrors may be arranged to repeat the process of passing the laser beam to and from the two LGM disks arbitrary number of times until the desired laser beam amplification is attained. At that point, the laser beam may either released from the laser system, reflected back causing it to retrace its path through the system. This configuration increases the effective gain length of the laser system and greatly improves laser power extraction.

In accordance with one embodiment of the present invention, a laser amplifier system comprises two laser amplifier modules each comprising a solid-state LGM disk. The system also comprises a multi-pass optical assembly including a plurality of relay mirrors. The plurality of mirrors is grouped in two groups. A first relay mirror of a first group of relay mirrors may be positioned to cause a laser beam injected into the system to be reflected into the LGM of a first laser amplifier module and a second relay mirror of the first group may be positioned to receive the amplified laser beam reflected from the LGM. The second relay mirror of the first group may reflect the beam onto a first relay mirror of the second group, which in-turn that may reflect the beam into the LGM of a second laser amplifier module. A second relay mirror of the second group may receive the beam from the second laser amplifier module and it may release it from the system. Alternatively, the second relay mirror of the second group may reflect the laser beam onto a third relay mirror of the first group, which may then reflect the laser beam into the first LGM disk. A fourth relay mirror of the first group may receive the beam reflected from first LGM disk and reflect it onto a third relay mirror of the second group, which may reflect it into the second LGM disk. A fourth relay mirror of the second group may receive the laser beam from the second LGM disk and it may release it from the system or reflect it onto a fifth relay mirror of the first group, and so on. Additional relay mirrors may be added and arranged to repeat the process of passing the laser beam alternately to and from the two LGM disks arbitrary number of times until the desired laser beam amplification is attained before it is released from the system.

In accordance with another embodiment of the present invention, a laser amplifier system comprises two laser amplifier modules each comprising a solid-state LGM disk. The system also comprises a multi-pass optical assembly including a plurality of relay mirrors. The plurality of mirrors is grouped in two groups. A first relay mirror of a first group of relay mirrors may be positioned to cause an injected laser beam to be reflected into the LGM of a first laser amplifier module and a second relay mirror of the first group may be positioned to receive the amplified laser beam reflected from the LGM. The second relay mirror of the first group may reflect the beam through a Faraday rotator onto a first relay mirror of the second group, which in-turn that may reflect the beam into the LGM of a second laser amplifier module. A second relay mirror of the second group may receive the beam from the second laser amplifier module and directs it through a quarter wave plate onto an end mirror. The end mirror reflects the laser beam through the quarter wave plate back onto the second relay mirror of the second group thus reversing its reversing its direction. The laser beam now travels through the amplified system in reverse direction and exists generally collinear with the injected beam. As in the previous embodiment, additional relay mirrors may be added. The additional relay mirrors may be arranged to repeat the process of passing the laser beam alternately to and from the two LGM disks arbitrary number of times until the desired laser beam amplification is attained before reversing the laser beam direction by the end mirror. Position of the Faraday rotator is preferably approximately half way in the laser beam path through the system in the forward direction, so that one half of the passes though the LGM disks occurs before the Faraday rotator and the other half of the passes though the LGM disks in forward direction occurs after the Faraday rotator.

In a variant to this embodiment where additional relay mirrors are added, the relay mirrors in each may be arranged in a generally circular pattern, causing the laser beam path to execute a three-dimensional trajectory in space. This variant permits a very compact grouping of all the components.

In accordance with yet another embodiment of the present invention, a laser resonator system comprises two laser amplifier modules, and end mirror, and an outcoupling mirror. The end mirror and the outcoupling mirror may be arranged to form a laser resonator. Such a laser resonator may be either stable or unstable. In addition, the outcoupling mirror may have a uniform, partially reflective coating or a graded reflectivity coating. The laser beam modules each further comprise a solid-state LGM disk. The system also comprises a multi-pass optical assembly including a plurality of relay mirrors. The plurality of mirrors is grouped in two groups. A first relay mirror of a first group of relay mirrors may be positioned to cause a laser beam from an outcoupling mirror to be reflected into the LGM of a first laser amplifier module and a second relay mirror of the first group may be positioned to receive the amplified laser beam reflected from the LGM. The second relay mirror of the first group may reflect the beam onto a first relay mirror of the second group, which in-turn that may reflect the beam into the LGM of a second laser amplifier module. A second relay mirror of the second group may receive the beam from the second laser amplifier module and directs it onto an end mirror. The end mirror reflects the laser beam through back onto the second relay mirror of the second group thus reversing its reversing its direction. The laser beam now travels through the amplified system in reverse direction and it is delivered back onto the outcoupling mirror, where a predetermined portion of the beam energy is allowed to pass through the mirror and released from the system. The remaining portion of the laser energy is reflected by the outcoupling mirror back onto the first relay mirror of the fists group. As in the previous embodiments, additional relay mirrors may be added and receive the laser beam from the second relay mirror of the second group. The additional relay mirrors may be arranged to repeat the process of passing the laser beam alternately to and from the two LGM disks arbitrary number of times until the desired laser beam amplification is attained before reversing the laser beam direction by the end mirror.

The solid-state laser with multi-pass optical assembly of the present invention, may be usable with or mounted on a mobile platform, such a military vehicle or the like for applications that may include, but are not necessarily limited to laser target illuminators, designators or similar applications. The present invention may also be used in commercial applications, for example, material processing such as cutting, welding, drilling or like purposes.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE PREFERRED EMBODIMENTS

Selected embodiments of the present invention will now be explained with reference to drawings. In the drawings, identical components are provided with identical reference symbols in one or more of the figures. It will be apparent to those skilled in the art from this disclosure that the following descriptions of the embodiments of the present invention are merely exemplary in nature and are in no way intended to limit the invention, its application, or uses.

"Laser gain medium" or "LGM" may refer to an optical material having a host lattice doped with suitable ions, which may be pumped by an external source of laser or other optical radiation to a laser transition. Examples of host lattice material that may be used in conjunction with the present invention may include yttrium aluminum garnet (YAG), gadolinium gallium garnet (GGG), gadolinium scandium gallium garnet (GSGG), lithium yttrium fluoride (YLF), yttrium vanadate, phosphate laser glass, silicate laser glass, sapphire or similar materials. The host material may be in a single crystal form or in a poly-crystalline (ceramic) form. Suitable dopants for such lasing mediums may include titanium (Ti), copper (Cu), cobalt (Co), nickel (Ni), chromium (Cr), cesium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), and ytterbium (Yb). Optical pump sources may be selected based on the absorption characteristics of the selected laser gain medium. For example, semiconductor diode lasers may be used for the optical pump source. The present invention is not intended to be limited to any specific lasing or laser gain material, or a specific pump source.

"Undoped optical medium" may refer to an optical material which is preferably substantially free of any substances that can absorb optical pump radiation. The undoped medium may be of the same host material as the laser gain medium but substantially not doped. In some embodiments of the present invention, however, undoped optical medium may be slightly doped with ions which may absorb optical radiation at the wavelengths of the optical pump and/or the laser gain transition, but are not pumped to a population inversion. Undoped optical medium may be bonded to selected surfaces of the laser gain medium by a fusion bond, or diffusion bond, or other suitable means. Such bonds must be highly transparent at the laser wavelength as well as pump wavelengths. A refractive index of the undoped optical medium and the bond are preferably closely matched to that of the laser gain medium. A suitable bond can be produced by fusion bonding, diffusion bonding, or optical contacting followed by heat treatment. Examples of optical contacting followed by heat treatment are described in the U.S. Pat. Nos. 5,441,803, 5,563,899, and 5,846,638 by Helmuth Meissner. Optical medium of this type may be obtained from Onyx Optics in Dublin, Calif. If the host medium is optical glass, doped and undoped sections may be readily attached by fusion bonding produced by casting. This process is available from Kigre Inc. in Hilton Head, S.C. If the host material is in ceramic form, such bond may be produced during a sintering process. An example of such a process is available from Konoshima Chemical Company LTD of Kagawa, Japan.

"ASE absorption cladding" may refer to an optical material capable of absorbing optical radiation at the wavelengths of one or more laser transitions in the laser gain medium. Examples of ASE absorption materials may include glass (such as phosphate glass, silicate glass, fluorophosphate glass), crystals, ceramics, RTV rubber, epoxy polymers, laminates of these materials or similar materials. These materials may be also doped with absorbing ions. For example, ions which absorb radiation at about 1.06 micrometers are primarily $Cu^{2+}$, $Sm^{3+}$, $Dy^{3+}$, $Cr^{4+}$, and $V^{3+} \cdot Cu^{2+}$. For example, ASE absorption claddings based on polymeric compounds attached to laser gain medium with adhesives is disclosed in U.S. Pat. No. 4,849,036 entitled "Composite Polymer-Glass Edge Cladding for Laser Disks" by Powell et al. ASE absorption cladding preferably has a refractive index closely matched to that of the laser medium to prevent reflection from an edge-cladding interface. In addition, ASE absorption cladding preferably has a coefficient of thermal expansion closely matched to that of the laser gain medium to reduce thermal stresses. ASE absorption cladding may be bonded to selected surfaces of the laser gain medium by an adhesive, fusion bond, diffusion bond, optical contacting followed by heat treatment similar to that described above with respect to the patent by Meissner, or other suitable methods, such as the glass casting process available from Kigre and the sintering process from Konoshima previously discussed. Such bond is preferably highly transparent at the laser wavelength and with a refractive index closely matched to that of the laser gain medium.

"ASE absorption coating" may refer to a thin film bonded onto selected surfaces of the laser gain medium and/or undoped optical medium and having the capability to absorb optical radiation at the wavelengths of one or more laser transitions in the laser gain medium. Such a thin film may be a combination of materials which may have indices of refraction which are greater than the index of refraction of the laser gain medium. Examples of materials may include germanium, silicon, gold, silver, silica, diamond, graphite, dried graphite ink, and some semiconductors and halides. An ASE absorption coating may be produced and applied in accordance with U.S. Pat. No. 5,335,237 entitled "Parasitic Oscillation Suppression in Solid State Lasers Using Absorbing Thin Films" by Zapata et al.

"Composite LGM" may refer to an assembly comprising at least one component made of laser gain medium material, and at least one component made of a group that may include the following materials: 1) an undoped optical medium, 2) an ASE absorption cladding, and 3) an ASE absorption coating. In addition, the gain medium assembly may have reflective, antireflective, and/or dichroic coatings as appropriate for operation as an amplifier of laser radiation.

"Optical aperture" may refer to a maximum transverse dimension of a laser beam, which can be received, amplified, and transmitted by LGM. The term "aperture" used herein may be synonymous to the one used in optics, such as the diameter of the objective of a telescope or other optical instrument.

"Diode bar" may refer to a source of optical radiation suitable for pumping a laser gain medium to a laser transition comprising a 1-dimensional array of semiconductor lasers comprising one or more diodes. The diodes may be mounted in a common substrate and placed on a heat exchanger.

Figure 3:
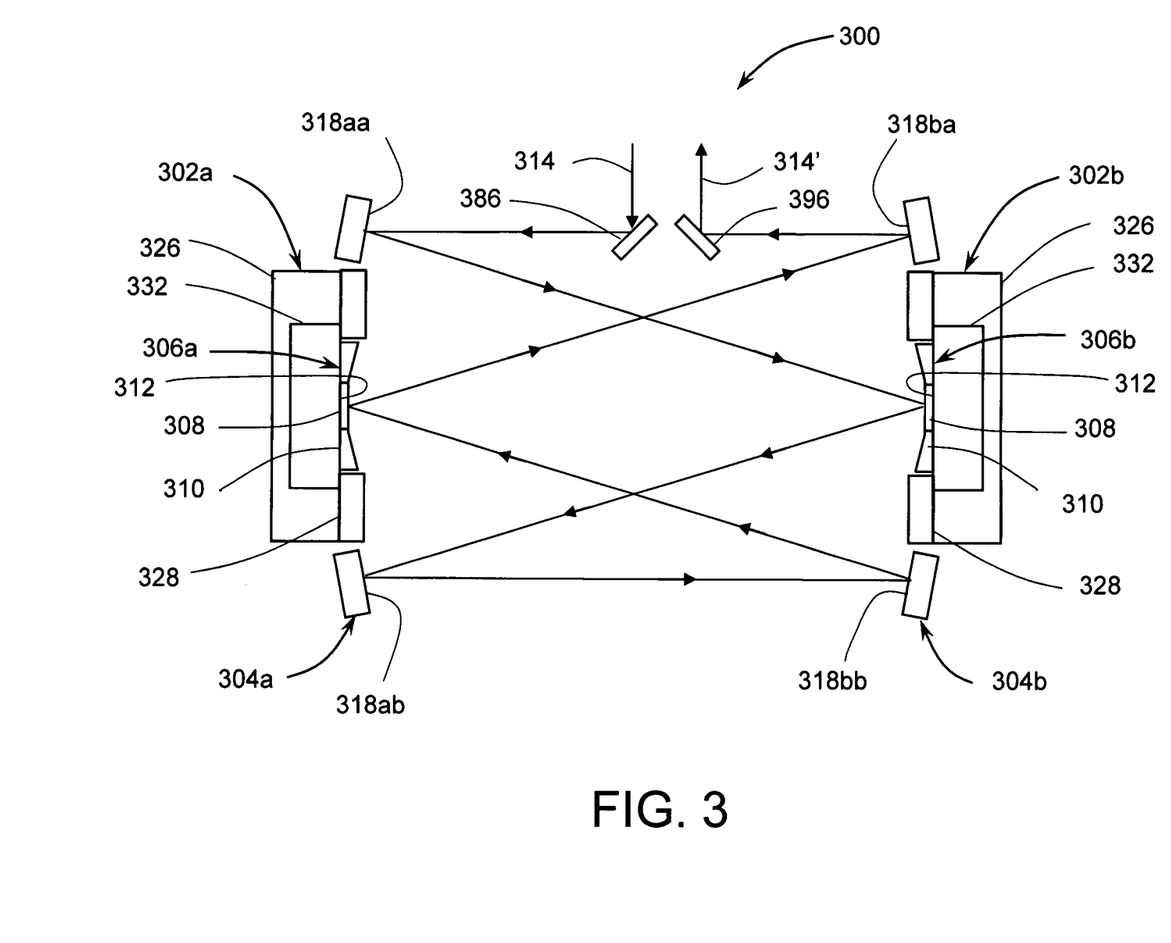
FIG. 3 is a schematic diagram of a solid-state laser amplifier with multi-pass beam delivery optics in accordance with one embodiment of the subject invention.

Referring to FIG. 3, there is shown a laser amplifier system 300 in accordance with one embodiment of the subject invention. The laser amplifier system 300 comprises two solid-state laser (SSL) amplifiers 302a and 302b, and a multi-pass laser optical assembly further comprising relay mirrors 318aa, 318ab, 318ba, and 318bb arranged in relay mirror groups 304a and 304b respectively comprising relay mirrors 318aa and 318ab, and 318ba, and 318bb. The laser amplifier system 300 further comprises an input mirror 386 and an output mirror 396. The relay mirror groups 304a and 304b together may form a multi-pass optical assembly.

The amplifiers 302a and 302b may include a solid-state gain material (LGM) disk 306a and 306b respectively. The LGM disks 306a and 306b may be identical and each may include a lasing portion 308 and a perimetral portion 310. The perimetral portion 310 may interface optically and mechanically with the lasing portion 308. The perimetral portion 310 may be formed in a predetermined shape to substantially prevent spontaneously emitted photons created in the lasing portion 308 and entering the perimetral portion 310 from returning to the lasing portion. Examples of LGM disks that may be used for LGM disk 306 are described in U.S. Pat. No. 7,477,674, entitled "High-Gain Solid-State Laser" issued to the Applicant et al., on Jan. 13, 2009, and incorporated herein by reference in its entirety and U.S. Pat. No. 7,085,304, entitled "Diode-Pumped Solid State Disk Laser and Method for Producing Uniform Laser Gain, issued to the Applicant on Aug. 1, 2006, and incorporated herein by reference in its entirety.

The LGM disks 306a and 306b may form substantially a disk, slab or other form. The lasing portion 308 and the perimetral portion 310 may be integrally formed from a monolithic slab of laser gain material which may be a preferred method of construction if either neodymium, ytterbium, erbium, holmium, thulium or quasi-3 level ions are used for lasing. In another embodiment of the present invention, the lasing portion 308 and perimetral portion 310 may be constructed from different materials as a composite structure. The perimetral portion 310 may be made from an undoped optical medium, ASE absorption cladding material similar to that previously described, a combination thereof or a similar material. Selected surfaces of the perimetral portion 310 may have ASE absorption coating or the like. In such an embodiment, the perimetral portion 310 may be secured to the lasing portion 308 by diffusion bonding, fusion bonding, adhesive bonding, optical contacting, co-sintering, or by other suitable technique. The LGM disks 306a and 306b each may be placed on a suitable heat exchanger (HEX) 332 to provide cooling and mechanical support. A laser diodes 328 may be used to inject power power into the disk and thus pump the laser ions in the lasing portion 308 to a laser transition. A reflective coating 312 may be disposed on a surface of lasing portion 308 between the LGM disk 306 and the heat sink 332. The HEX 332 and the laser diodes may be further placed onto a common support base 326.

In operation, laser diodes 328 inject optical power to the lasing portions 308 and pump the laser ions to a laser transition, thus producing laser gain in the lasing portions 308. An input laser beam 314 may be injected into the multi-pass optical assembly by the input mirror 386. The laser beam 314 may be initially directed from the input mirror 386 to the relay mirror 318aa of the relay mirror group 304a, and therefrom onto the lasing portion 308 of the LGM disk 306b where the beam is amplified and reflected to the relay mirror 318ab the relay mirror group 304a. The relay mirror 318ab reflects the laser beam 314 onto the relay mirror 318bb of the relay mirror group 304b, and therefrom onto the lasing portion 308 of the LGM disk 306a where the beam is amplified and reflected to relay mirror 318ba of the relay mirror group 304b. The laser beam 314 may be reflected from relay mirror 318ba onto the output mirror 396 and caused to exit from the laser system 300 as an amplified laser beam 314'.

Alternatively, additional relay mirrors may be added and the relay mirror 318ba may reflect the laser beam onto an additional relay mirror. The additional relay mirrors may be arranged to repeat the process of passing the laser beam alternately to and from the lasing portions 308 of the two LGM disks 306a and 306b arbitrary number of times until the desired laser beam amplification is attained before the beam is delivered to the output mirror 396 and exits from the laser system 300.

Figure 4:
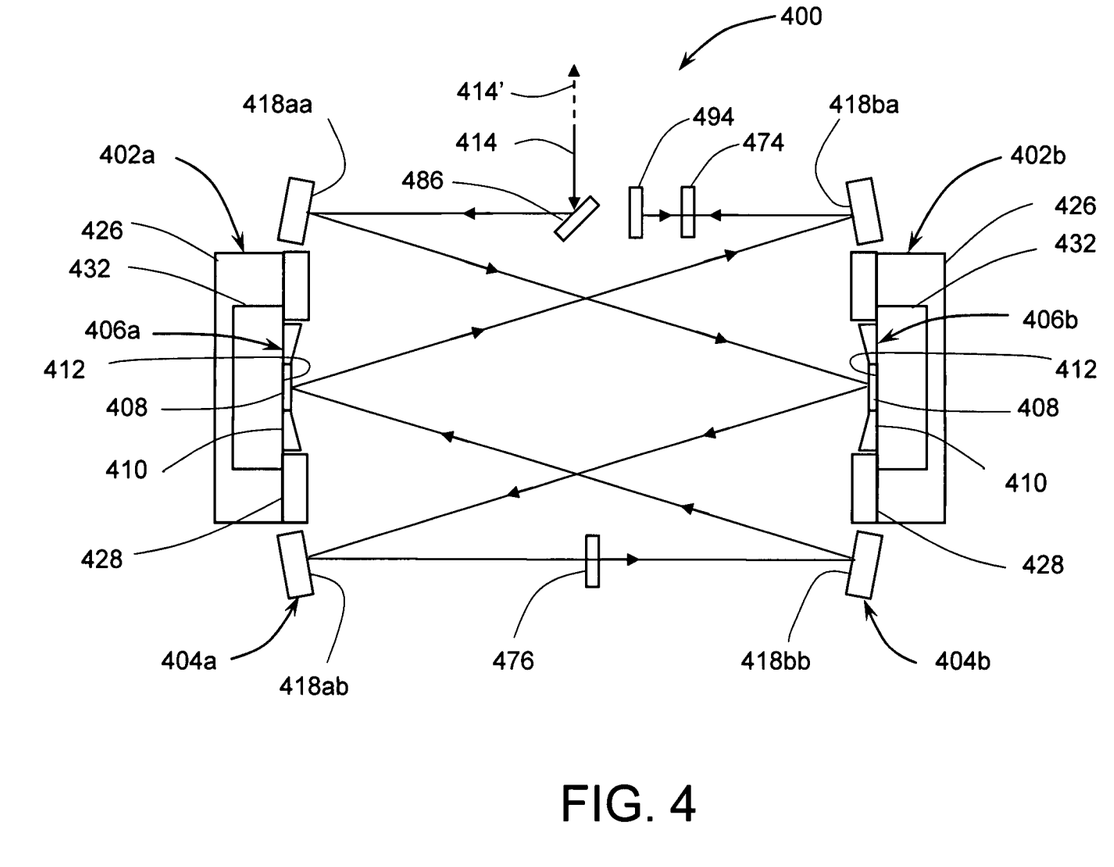
FIG. 4 is a schematic diagram of a solid-state laser amplifier with multi-pass beam delivery optics in accordance with another embodiment of the subject invention.

Referring now to FIG. 4, there is shown a laser amplifier system 400 in accordance with one embodiment of the subject invention. The laser amplifier system 400 comprises two solid-state laser (SSL) amplifiers 402a and 402b, and a multi-pass laser optical assembly with relay mirrors 418aa, 418ab, 418ba, and 418bb arranged in relay mirror groups 404a and 404b respectively containing relay mirrors 418aa and 418ab, and 418ba, and 418bb. The laser amplifier system 400 further comprises an input mirror 486, and end mirror 494, a quarter wave plate 474, and a Faraday rotator 476. The solid-state laser (SSL) amplifiers 402a and 402b may have same construction and functionality as the SSL amplifiers 302a and 302b of FIG. 3. The relay mirror groups 404a and 404b together may form a multi-pass optical assembly.

In operation, laser diodes 428 inject optical power to the lasing portions 408 and pump the laser ions to a laser transition, thus producing laser gain in the lasing portions 408. An input laser beam 414 may be injected into the multi-pass optical assembly by the input mirror 486. The laser beam 414 may be directed from the input mirror 486 to the relay mirrors 418aa of the relay mirror group 404a, and therefrom onto the lasing portion 408 of the LGM disk 406b where the beam is amplified and reflected to the relay mirror 418ab the relay mirror group 404a. The relay mirror 418ab reflects the laser beam 414 through the Faraday rotator 476 onto the relay mirror 418bb of the relay mirror group 404b, and therefrom onto the lasing portion 408 of the LGM disk 406a where the beam is amplified and reflected to the relay mirror 418ba of the relay mirror group 404b. The laser beam 414 may be directed from the relay mirror 418ba through the quarter wave plate 474 onto the end mirror 494. The end mirror 494 may be arranged to reflect the laser beam back through the quarter wave plate 474 back onto the relay mirror 418ba thus causing the laser beam to reverse its direction and retrace its path though the systems, becoming further amplified, and eventually landing on the input mirror 486. The input mirror 486 may now direct the laser beam out of the amplifier system 400 as a laser beam 414' which may be collinear with the input beam 414.

As in the system 300 of FIG. 3, additional relay mirrors may be added and the relay mirror 418ba may reflect the laser beam onto an additional relay mirror. The additional relay mirrors may be arranged to repeat the process of passing the laser beam alternately to and from the lasing portions 408 of the two LGM disks 406a and 406b arbitrary number of times until the desired laser beam amplification is attained before the beam is delivered to the end mirror 494. In this case, the Faraday rotator 476 is preferably relocated to a position approximately half way in the laser beam path through the system in the forward direction, so that one half of the passes though the laser portions 408 occurs before the Faraday rotator and the other half of the passes though the laser portions 408 in forward direction occurs after the Faraday rotator. See, for example, Section 4.1.3 Nd:YAG Amplifier in "Solid-State Laser Engineering," by W. Koechner, 5$^{th}$ edition, published by Springer-Verlag, New York, N.Y., 1999.

Figure 5:
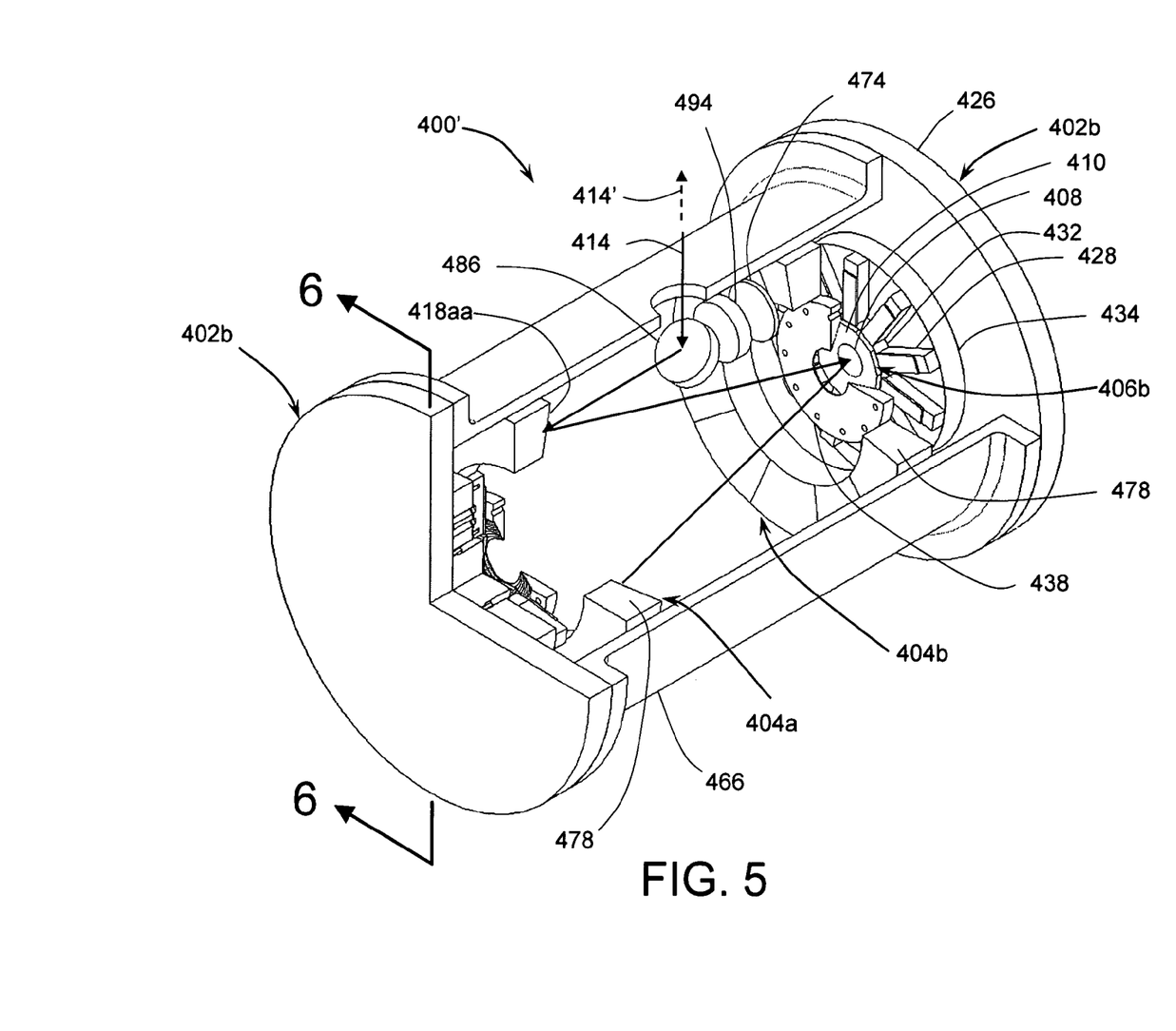
FIG. 5 is an isometric view with a partial cutaway exposing the components of a solid-state laser amplifier with multi-pass beam delivery optics in accordance with a variant of the invention shown in FIG. 4.
Figure 6:
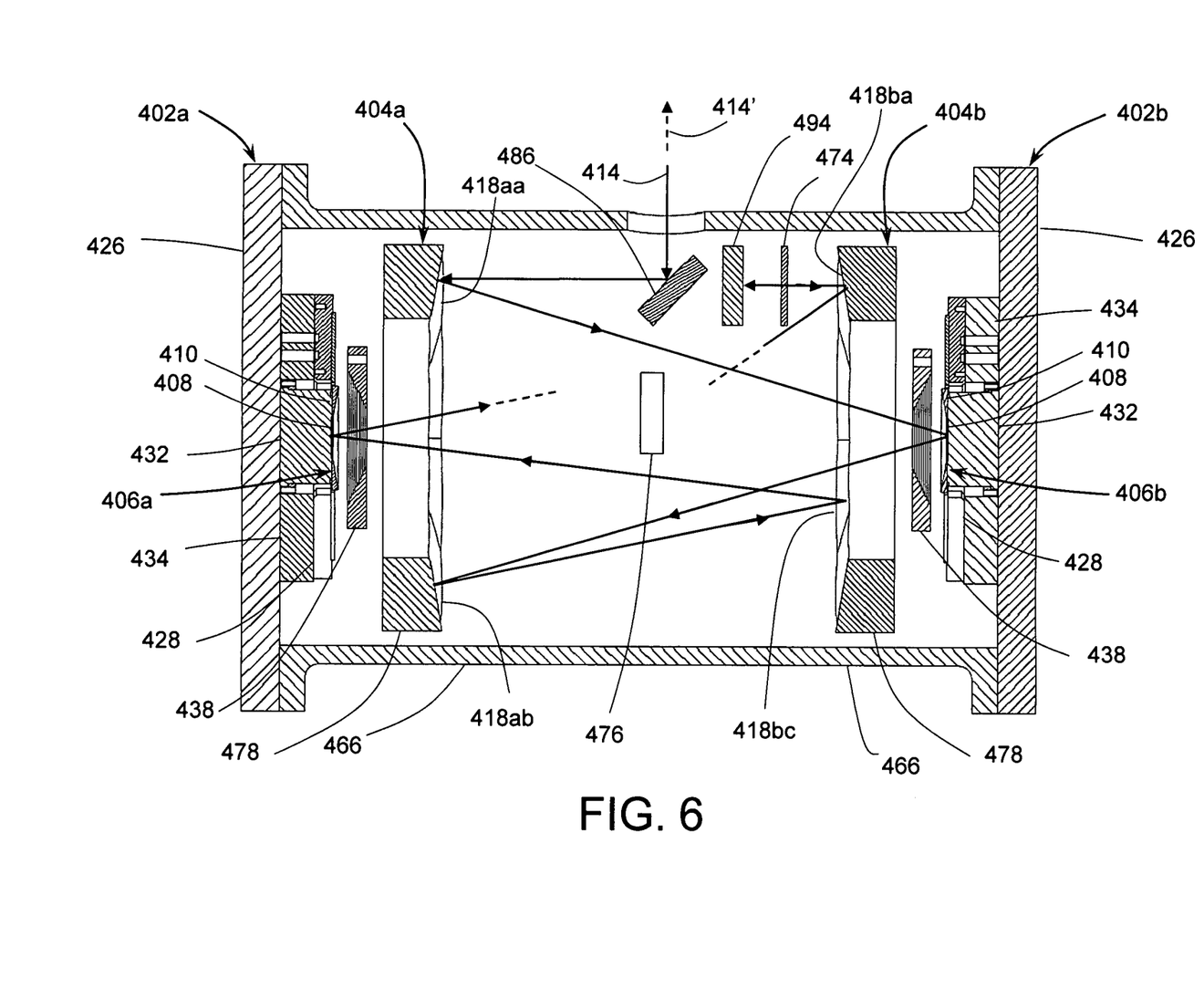
FIG. 6 is a cross-sectional view 6-6 of the solid-state laser amplifier with multi-pass beam delivery optics of FIG. 5.

Referring now to FIGS. 5 and 6 there is shown a laser amplifier system 400' in accordance with a variant of the embodiment of the subject invention shown in FIG. 4 and having additional relay mirrors. The laser amplifier system 400' is substantially same as the laser amplifier system 400 except that the relay mirror groups 404a and 404b each are arranged in a generally circular pattern. The circular patterns of the relay mirror groups 404a and 404b are preferably on a common axis with the laser modules 402a and 402b. In addition, the individual relay mirrors 418 are shown being formed as facets on a common substrate 478. However, the invention also admits relay mirrors 418 being formed as individual components. The circular arrangement of the relay mirror groups 404a and 404b makes it easier to construct a laser amplifier system suitable for a large number of laser beam passes though the LGM disks, thus allowing for a very high amplification. Furthermore, the circular arrangement of the relay mirror groups permits a very compact grouping of all the components. The SSL amplifiers 402a and 402b, the relay mirror groups 404a and 404b, as well as the input mirror 486, end mirror 494, quarter wave plate 474, and the Faraday rotator 476 may be mounted on an optical bench 466, which may be generally formed as a cylinder. A radiation shields 438 may be provided to capture and absorb (at least in part) the ASE and fluorescence radiation for the LGM disks 406a and 406b.

Figure 7:
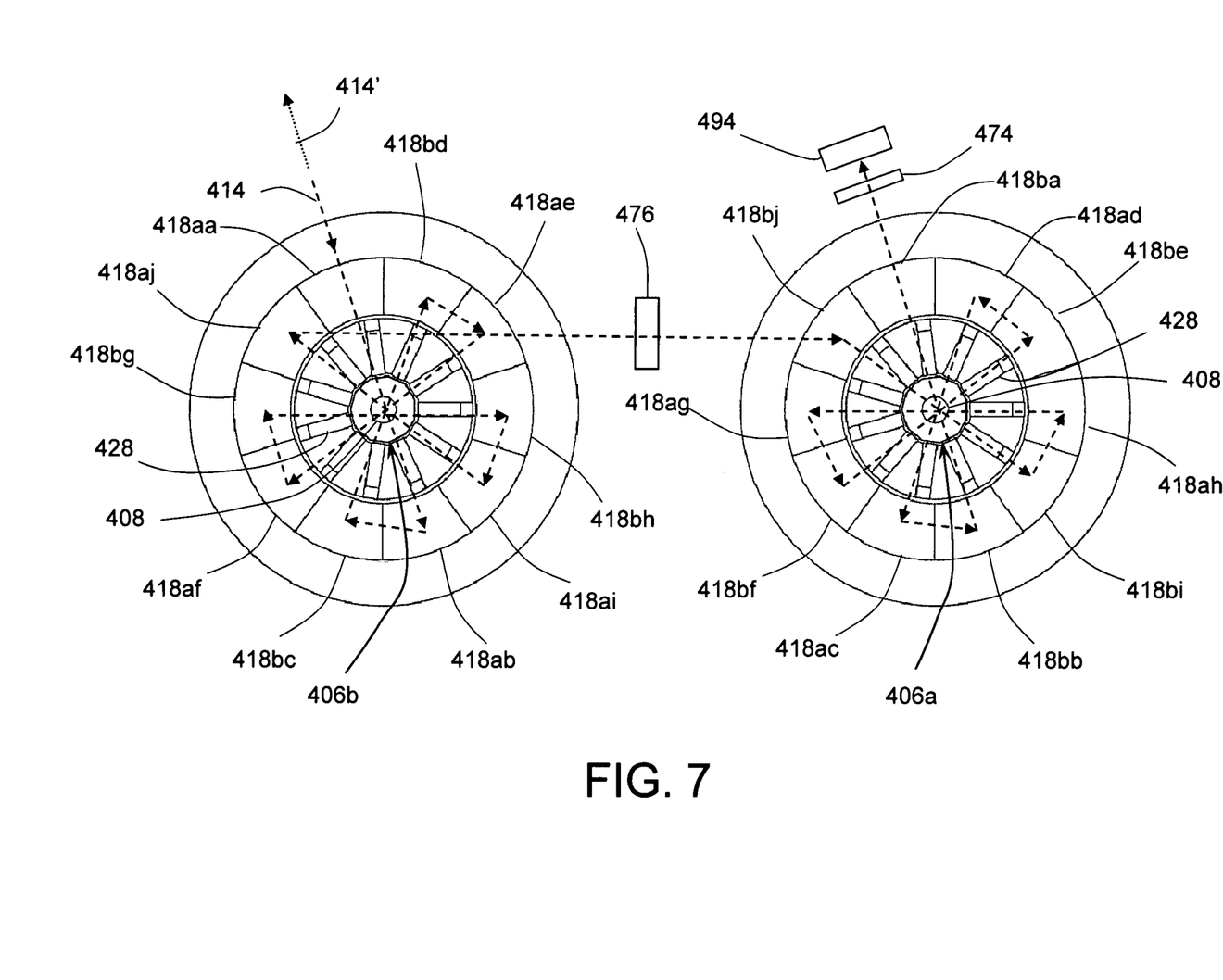
FIG. 7 is a diagram showing the beam path in the solid-state laser amplifier of FIG. 5.

The circular arrangement of the relay mirror groups causes the path of laser beam 414 to execute a three-dimensional trajectory in space. FIG. 7 is a schematic diagram showing the path of the laser beam though the amplifier assembly. The individual relay mirrors 418 are labeled 418xy, where the "x" and "y" identify the mirror location. In particular, "x" is either "a" or "b" and it corresponds to the location of the relay mirror 418 in the relay mirror group 404a or 404b, respectively. For example, a mirror 418ay, is in the mirror group 404a. The label "y" identifies the position of a mirror 418 within its particular relay mirror group. For example, the relay mirror 418bf, is in the f-position in the mirror group 404b.

Figure 8:
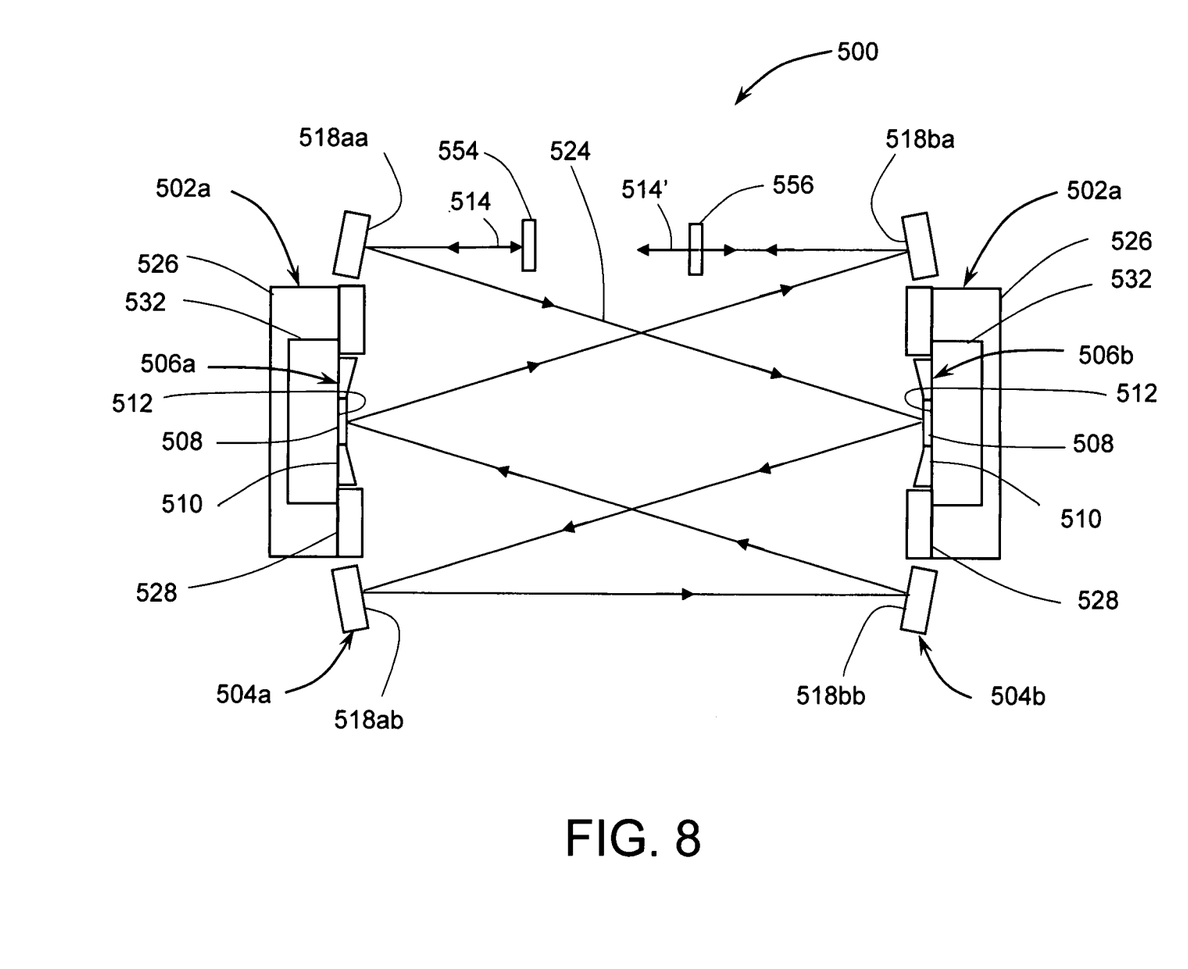
FIG. 8 is a schematic diagram of a solid-state laser oscillator with multi-pass beam delivery optics in accordance with yet another embodiment of the subject invention.

Referring now to FIG. 8, there is shown a laser oscillator system 500 in accordance with one embodiment of the subject invention. The laser amplifier system 500 comprises two solid-state laser (SSL) amplifiers 502a and 502b, and a multi-pass laser optical assembly further comprising relay mirrors 518aa, 518ab, 518ba, and 518bb arranged in relay mirror groups 504a and 504b respectively comprising relay mirrors 518aa and 518ab, and 518ba, and 518bb. The laser amplifier system 500 further comprises an outcoupling mirror 556 and an end mirror 554. The end mirror 554 and the outcoupling mirror 556 may be arranged to form a laser resonator. Such a laser resonator may be either stable or unstable. In addition, the outcoupling mirror 556 may have a uniform, partially reflective coating or a graded reflectivity coating. The SSL amplifiers 502a and 502b may have same construction and functionality as the SSL amplifiers 302a and 302b of FIG. 3. The relay mirror groups 504a and 504b together may form a multi-pass optical assembly.

In operation, laser diodes 528 inject optical power to the lasing portions 508 and pump the laser ions to a laser transition, thus producing laser gain in the lasing portions 508. A laser beam 514 directed into the end mirror 554 is reflected onto the relay mirror 518aa of the relay mirror group 504a, and therefrom onto the lasing portion 508 of the LGM disk 506b where the beam is amplified and reflected to relay mirror 518ab the relay mirror group 504a. The relay mirror 518ab reflects the laser beam 514 onto relay mirror 518bb of the relay mirror group 504b, and therefrom onto the lasing portion 508 of the LGM disk 506a where the beam is amplified and reflected to relay mirror 318ba of the relay mirror group 504b. The laser beam 514 may be reflected from relay mirror 518ba onto the outcoupling mirror 556. A predetermined portion of the laser beam energy is allowed to pass through the outcoupling mirror 556 and released from the laser system 500 as an output laser beam 514'. The remaining portion of the laser energy is reflected by the outcoupling mirror 556 back onto the relay mirror 518ba and retraces its path all the way to the end mirror 554, while being amplified in the process.

As in the system 300 of FIG. 3, additional relay mirrors may be added and the relay mirror 518ba may reflect the laser beam onto an additional relay mirror. Additional relay mirrors may be added and receive the laser beam from the relay mirror 518ba. The additional relay mirrors may be arranged to repeat the process of passing the laser beam alternately to and from the lasing portions 508 of the two LGM disks 506a and 506b arbitrary number of times until the desired laser beam amplification is attained before the beam is delivered to the outcoupling mirror 556 and exits from the laser system 500.

The present invention may also be used in commercial applications, for example, material processing such as cutting, welding, drilling or like operations. The present invention enables a very simple, compact and inexpensive solid-state laser system with average power between about 5 kilowatts and about 15 kilowatts (although other power ranges may be available) with exceptional beam quality.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

Moreover, terms that are expressed as "means-plus function" in the claims should include any structure that can be utilized to carry out the function of that part of the present invention. In addition, the term "configured" as used herein to describe a component, section or part of a device includes hardware and/or software that is constructed and/or programmed to carry out the desired function.

The term "suitable", as used herein, means having characteristics that are sufficient to produce a desired result. Suitability for the intended purpose can be determined by one of ordinary skill in the art using only routine experimentation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof. Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A laser system, comprising: two solid-state laser gain material (LGM) modules, and a multi-pass optical assembly including a plurality of pairs of relay mirrors, wherein a first mirror and a second mirror of each pair of relay mirrors are positioned to cause a laser beam from one of said LGM modules incident on the first mirror to be reflected directly to the second mirror and to cause the second mirror to reflect the laser beam directly to another of said LGM modules for further amplification, said laser beam being reflected back and forth directly between the LGM modules and each of the respective pairs of the plurality of pairs of relay mirrors.

2. The laser system of claim 1, wherein said multi-pass optical assembly comprises two groups of relay mirrors, with the relay mirrors in each group are being arranged in a circular configuration.

3. The laser system of claim 1, further including an end mirror arranged to reverse the direction of said laser beam.

4. The laser system of claim 1, further including an end mirror arranged to cause said laser beam to reverse its direction and substantially retrace its path through said multi-pass optical assembly.

5. The laser system of claim 1, further including an end mirror and an outcoupling mirror, said end mirror and said outcoupling mirror arranged to form a laser resonator.

6. The laser system of claim 4, wherein said resonator is a stable resonator.

7. The laser system of claim 4, wherein said outcoupling mirror is a graded reflectivity coating.

8. The laser system of claim 5, wherein said resonator is an unstable resonator.

9. A laser system, comprising: a first solid-state laser gain material (LGM) disk, a second solid-state LGM disk, and a multi-pass optical assembly including a plurality of relay mirrors; said relay mirrors arranged in two groups, a first relay mirror in the first group arranged to receive a laser beam from said first LGM disk and to pass said laser beam to another relay mirror in said second group; said another relay mirror in said second group being arranged to pass said laser beam to said second LGM disk; said second LGM disk being arranged to reflect said laser beam to yet another relay mirror in the second group; said yet another relay mirror in the second group being arranged to pass said laser beam to still another relay mirror in said first group; said still another mirror arranged to reflect said laser beam back to said first LGM disk.

10. The laser system of claim 9, wherein said process of sending said laser beam from said first LGM disk to said second LGM disk and back to said first LGM disk is repeated at least one more time.

11. The laser system of claim 9, further comprising an end mirror, a quarter wave plate, and a Faraday rotator.

12. The laser system of claim 9, wherein said multi-pass optical assembly comprises two groups of relay mirrors, with the relay mirrors in each group are being arranged in a circular configuration.

13. The laser system of claim 9, further including an end mirror arranged to cause said laser beam to reverse its direction and substantially retrace its path through said multi-pass optical assembly.

14. The laser system of claim 9, further including an end mirror and an outcoupling mirror, said end mirror and said outcoupling mirror arranged to form a laser resonator.

* * * * *